United States Patent
Bell et al.

[19]

[11] Patent Number: 6,115,386
[45] Date of Patent: Sep. 5, 2000

[54] SYSTEMS AND METHODS FOR TRANSFERRING A BONDED CALL

[75] Inventors: Robert T. Bell, Bountiful, Utah; Paul S. Hahn, Plano, Tex.; William C. Forsythe; James R. Tighe, both of Frisco, Tex.

[73] Assignee: Cisco Systems, Inc., San Jose, Calif.

[21] Appl. No.: 08/815,380

[22] Filed: Mar. 11, 1997

[51] Int. Cl.[7] .................................................. H04L 12/28
[52] U.S. Cl. ........................................... 370/412; 370/508
[58] Field of Search ..................................... 370/252, 412, 370/241, 242, 519, 508, 352

[56] References Cited

U.S. PATENT DOCUMENTS

| | | | |
|---|---|---|---|
| 5,262,875 | 11/1993 | Mincer et al. | 358/335 |
| 5,361,261 | 11/1994 | Edem et al. | 370/85.3 |
| 5,408,465 | 4/1995 | Gusella et al. | 370/17 |
| 5,442,749 | 8/1995 | Northcutt et al. | 395/200.09 |
| 5,550,982 | 8/1996 | Long et al. | 395/200.13 |
| 5,581,784 | 12/1996 | Tobagi et al. | 385/826 |
| 5,625,404 | 4/1997 | Grady et al. | 348/7 |
| 5,633,865 | 5/1997 | Short | 370/412 |
| 5,680,389 | 10/1997 | Douglas et al. | 370/242 |
| 5,706,279 | 1/1998 | Teraslinna | 370/412 |
| 5,742,596 | 4/1998 | Baratz et al. | 370/356 |
| 5,856,999 | 1/1999 | Robinson et al. | 370/248 |
| 5,862,134 | 1/1999 | Deng | 370/352 |

*Primary Examiner*—Hassan Kizou
*Assistant Examiner*—Daniel Previl
*Attorney, Agent, or Firm*—Baker Botts L.L.P.

[57] ABSTRACT

For use in a communications network capable of establishing a bonded call between first and second endpoints using at least two bonded communication channels, a subsystem for preserving a relative latency of the at least two bonded communication channels to allow the bonded call to be transferred to a third endpoint. The subsystem includes: (1) a buffer depth index detection circuit that detects learned values of buffer depth indices associated with the bonded call and stored at a first location and (2) a buffer depth index transmission circuit, coupled to the buffer depth index detection circuit, that transmits the learned values to a second location accessible by the third endpoint to allow the bonded call to be transferred to the third endpoint without requiring the third endpoint to relearn the values.

40 Claims, 4 Drawing Sheets

SYSTEMS AND METHODS FOR TRANSFERRING A BONDED CALL

CROSS-REFERENCE TO RELATED APPLICATIONS

This application is related to the following U.S. Pat. Nos. and U.S. patent applications:

| U.S. Pat. No. or Ser. No. | Title | Inventor(s) | Filing Date |
|---|---|---|---|
| 5,594,732 | BRIDGING AND OUT-OF-BAND SIGNALING SUBSYSTEMS AND METHODS FOR A MULTIMEDIA SYSTEM | Robert T. Bell, et al. | March 3, 1995 |
| 8/397,945 | SYSTEM AND METHOD FOR SIGNALING AND CALL PROCESSING FOR PRIVATE AND HYBRID VIDEO/AUDIO COMMUNICATIONS SYSTEMS INCLUDING MULTIMEDIA SYSTEMS | Robert T. Bell, et al. | March 3, 1995 |
| 8/402,834 | DISTRIBUTED INTERACTIVE MULTIMEDIA SYSTEM ARCHITECTURE | Paul S. Hahn, et al. | March 13, 1995 |
| 8/404,191 | MULTIMEDIA CLIENT FOR MULTIMEDIA/HYBRID NETWORK | Ronald D. Higgins, et al. | March 13, 1995 |
| 8/379,365 | MULTIMEDIA SYSTEM HAVING CENTRAL POWER SOURCE AND DISTRIBUTION SUBSYSTEM | Richard K. Hunter, et al. | January 27, 1995 |

The above-listed patents and patent applications are commonly assigned with the present invention and are incorporated herein by reference as if reproduced herein in their entirety.

TECHNICAL FIELD OF THE INVENTION

The present invention is directed, in general, to telecommunications systems and, more specifically, to systems and methods for transferring, placing on hold and retrieving a bonded call so as to preserve the relative network latency between channels over which the bonded call is communicated.

BACKGROUND OF THE INVENTION

Currently, "Information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information" is directed primarily to computer data, often organized in files and records, and perhaps constituting textual and graphical data. Such computer data are generally referred to as "data."

To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

Furthermore, as the volume of information communicated through the networks continued to expand, it became apparent that the single dial-up lines (either analog or digital) dedicated to transfer the information through the networks were inadequate. More specifically, the single dial-up lines could not transfer the information at a fast enough rate to keep up with the tremendous expansion. In connection therewith, the techniques to employ several independent dial-up circuits to increase the available transfer rate demonstrated many limitations. For instance, one of the more difficult problems was coordinating the information that traveled through the individual circuits so that the information could be reassembled at the receiving end in the proper sequence. This problem generally occurs because the independent circuits may be routed through intervening switched networks that traverse different paths through the entire network. Obviously, the delays through separate paths in the network are typically not identical thereby causing differing transit time delays for information streams carried on different circuits.

Attempts have been made in the past to manage the large volume of information through the network infrastructures. One such effort was developed by the Bandwidth ON Demand Interoperability Group ("BONDING"). The charter of the group is to develop common control and synchronization standards necessary to manage high speed information as it travels through networks such as the public network. The standards are embodied in *Interoperability Requirements for Nx56/64 kbit/s Calls,* Version 1.0, Bandwidth ON Demand Interoperability Group (1992), and, *Interoperability Requirements for Nx56/64 kbit/s Calls,* Version 1.1, Bandwidth ON Demand Interoperability Group (1992). The aforementioned standards are herein incorporated by reference. The standards allow equipment from separate vendors to interoperate over existing switched networks and integrated services digital networks. The standards describe four modes of inverse multiplexer ("I-MUX") interoperability. It allows I-MUXs from different manufacturers to subdivide a wideband signal into multiple 56- or 64-Kbps channels, pass these individual channels over a switched digital network, and recombine them into a single high-speed signal at the receiving end.

More specifically, the BONDING specification discloses a set of methods that allow the receiving endpoints to measure the delay or relative latency between multiple circuits or channels that are to be combined into a single virtual communications channel. The BONDING specification then provides for variable buffering for the individual channels so that the relative latencies between channels are reconciled. In one of the most prevalently employed modes of operation, the equipment compliant with the BONDING specification will determine the relative latencies at the inception of the communications session and assumes that the relationships do not change. In other modes of operation, contingencies provide for the real-time monitoring of the relative latencies and for a dynamic alteration of the number of individual channels making up the bonded channel. A relatively high level of overhead is associated with the other modes of operation and, to date, these modes have not been prevalently employed.

Accordingly, what is needed in the art is a recognition that relative latencies in communications networks may be quantified and, more specifically, a system and method whereby the relative latencies may be associated with a bonded call so that the bonded call can, then, be transferred, placed in a hold state and retrieved without requiring that the values of the relative latencies be relearned once established.

SUMMARY OF THE INVENTION

To address the above-discussed deficiencies of the prior art, it is a primary object of the present invention to provide a way of transferring a bonded call, placing a bonded call into a hold state and retrieving the bonded call at the same endpoint or another endpoint, or retrieving a bonded call.

In the attainment of the above primary object, the present invention provides, for use in a communications network capable of establishing a bonded call between first and second endpoints using at least two bonded communication channels, a subsystem for preserving a relative latency of the at least two bonded communication channels to allow the bonded call to be transferred to a third endpoint. The subsystem includes: (1) a buffer depth index detection circuit that detects learned values of buffer depth indices associated with the bonded call and stored at a first location and (2) a buffer depth index transmission circuit, coupled to the buffer depth index detection circuit, that transmits the learned values to a second location accessible by the third endpoint to allow the bonded call to be transferred to the third endpoint without requiring the third endpoint to relearn the values.

The present invention introduces the broad concept of transmitting buffer depth indices to allow bonded calls to be redirected. Alternatively, the buffer depth indices may be stored or manipulated to allow the bonded calls to be redirected. As those skilled in the art understand, each of the communication channels that are bonded together in a bonded call are subject to different network latencies. Buffer depth indices are employed in bonding schemes to introduce additional terminal latencies to the data carried on the channels to compensate for the different network latencies, thereby equalizing the overall latencies of the channels to synchronize the same.

The present invention therefore allows a bonded call to be transferred from the second endpoint to the third endpoint, placed on hold or retrieved, without requiring the third endpoint to relearn the values of the buffer depth indices. Thus, the second endpoint may place the bonded call on hold and later retrieve the bonded call; or the third endpoint may later retrieve the bonded call, resulting in a transfer of the call by way of hold. Alternatively, a direct transfer from the second endpoint to the third endpoint may be effected without placing the bonded call on hold.

In an alternative embodiment of the present invention, the subsystem also includes a buffer depth index reception circuit, associated at the second location, capable of receiving the learned values to allow the bonded call to be transferred to the third endpoint without requiring the third endpoint to relearn the values. In a related, but alternative embodiment, the second location is located at the third endpoint. Of course, the broad scope of the present invention is not limited by the positioning of the first and second locations.

In an alternative embodiment of the present invention, the second and third endpoints are within a nonmonochronomic subnetwork coupled to the communications network, the subsystem further including a buffer depth index modifying circuit, coupled to the buffer depth index transmission circuit, that modifies the learned values as a function of static transit time differences between the second and third endpoints to allow the bonded call to be transferred from the second endpoint to the third endpoint without substantially altering the relative latency. A "subnetwork," as used herein, is simply a portion of a network. A "monochronomic subnetwork" is defined for purposes of the present invention as a subnetwork in which no transit time differences exist between independent channels connected between endpoints within the subnetwork. In such subnetworks, no changes in latencies are introduced when data are rerouted from one endpoint to another. Therefore, buffer depth index values may be employed without modification. A "nonmonochronomic subnetwork" is defined as a subnetwork in which transit time differences do exist between independent channels connected between endpoints within the subnetwork, but such transit time differences are static; they do not change over time. In such subnetworks, latencies are subject to change when data are rerouted from one endpoint to another. Therefore, buffer depth index values are preferably modified by taking into account marginal static time differences, resulting in buffer depth indices being increased or decreased as necessary to accommodate the changed transit time differences. Of course, when a bonded call is placed on hold and retrieved by the same endpoint, transit time differences do not exist. In such cases, the buffer depth index values preferably remain unchanged.

In an alternative embodiment of the present invention, the subsystem further includes a buffer depth index storage circuit, coupled to the buffer depth index transmission circuit, that temporarily stores the learned values for subsequent restoration to the buffer depth indices to allow the bonded call to be placed on hold. The buffer depth index storage circuit most preferably takes the form of volatile memory associated with the second endpoint. One may think of the storage circuit as an array into which values are stored when placing a bonded call on hold and from which values are read when retrieving the bonded call.

In an alternative embodiment of the present invention, the subsystem further includes a buffer depth index information transceiver, coupled to the buffer depth index transmission circuit, that provides an interface for the values transmitted from or received at the second endpoint. Of course, the third endpoint may also include a transceiver to provide an interface for the values transmitted from or received at the third endpoint.

In an alternative embodiment of the present invention, the subsystem further includes a communications channel transmitter and a communications channel receiver that transmit the bonded call from the second endpoint and receive the bonded call at the second endpoint. Of course, the third endpoint may also include a communications channel transmitter and a communications channel receiver that transmit the bonded call from the third endpoint and receive the bonded call at the third endpoint.

In an alternative embodiment of the present invention, the at least two communication channels carry a multimedia data stream between the first endpoint and the second endpoint. "Multimedia" is defined as a combination of at least two of video, voice and computer data. Of course, the present invention may be advantageously applied to a single media bonded call.

In an alternative embodiment of the present invention, the communications network is selected from the group consisting of: (1) an Asynchronous Transfer Mode (ATM) network; (2) a Private Switched Network and (3) a Public Switched Network. Those skilled in the art should understand that other well known communications network topologies, and combinations of networks, are equally applicable as environments within which the present invention may operate.

In an alternative embodiment of the present invention, the buffer depth index detection circuit and the buffer depth index transmission circuit comprise sequences of executable software instructions. These and the other circuits described herein may be embodied in software, hardware, firmware or any combination thereof. The broad scope of the present invention is not limited to a particular embodiment.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

While the systems and methods of the present invention will hereinafter be described in a specific environment, the foregoing embodiment is set forth for illustrative purposes only. Of course, other embodiments of the present invention employable in other network infrastructures are well within the broad scope of the present invention. Those skilled in the art should understand that other communications network topologies, and combinations of networks, are equally applicable as environments within which the present invention may operate.

Figure 1:
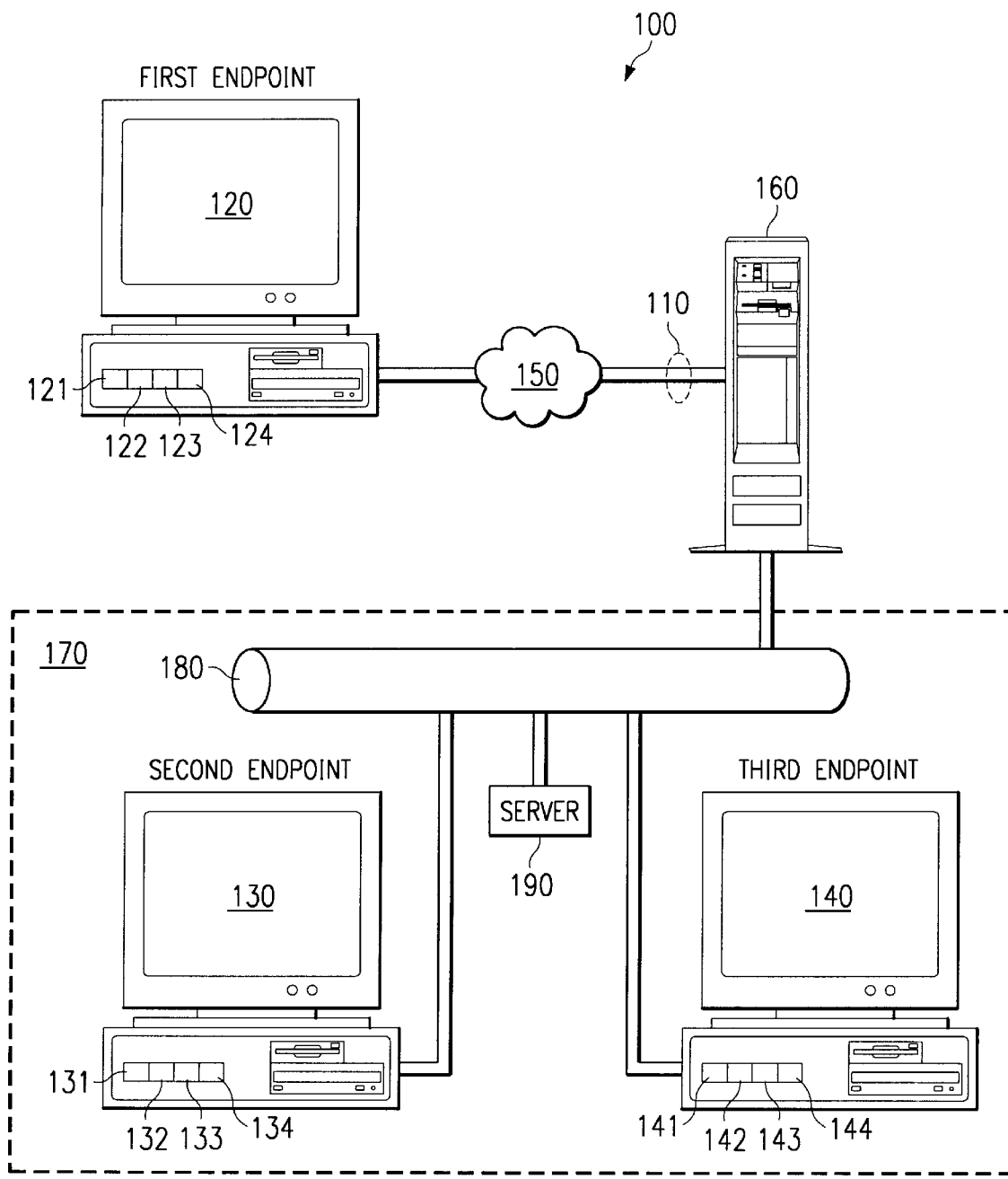
FIG. 1 illustrates a block diagram of a representative communications network that provides an environment for the operation of a system constructed according to the principles of the present invention.

Referring initially to FIG. 1, illustrated is a block diagram of a representative communications network (e.g., a multimedia communications network) 100 that provides an environment for the operation of a system constructed according to the principles of the present invention. The communications network 100 includes a plurality of communications channels (collectively designated 110) capable of being bonded together to form a bonded call (e.g., multimedia bonded call). The communications network also includes a first endpoint 120, second endpoint 130 and third endpoint 140. While the first, second and third endpoints 120, 130, 140 are multimedia personal computer workstations (each having an audio and video input port 121, 122, 131, 132, 141, 142, respectively, and each having an audio and video output port 123, 124, 133, 134, 143, 144, respectively), other communication devices are well within the broad scope of the present invention.

The first endpoint 120 is coupled through an external network (e.g., the Public Switched Network) 150 to a gateway 160. Those skilled in the art should understand that other communications network topologies, and combinations of networks, are equally applicable as environments within which the present invention may operate. The gateway 160 is coupled to a local area subnetwork 170 through a distribution bus 180 and to the second and third endpoints 130, 140. A server (e.g., a general purpose computer with a signal processing resource) 190 is also coupled to the distribution bus 180.

Figure 2:
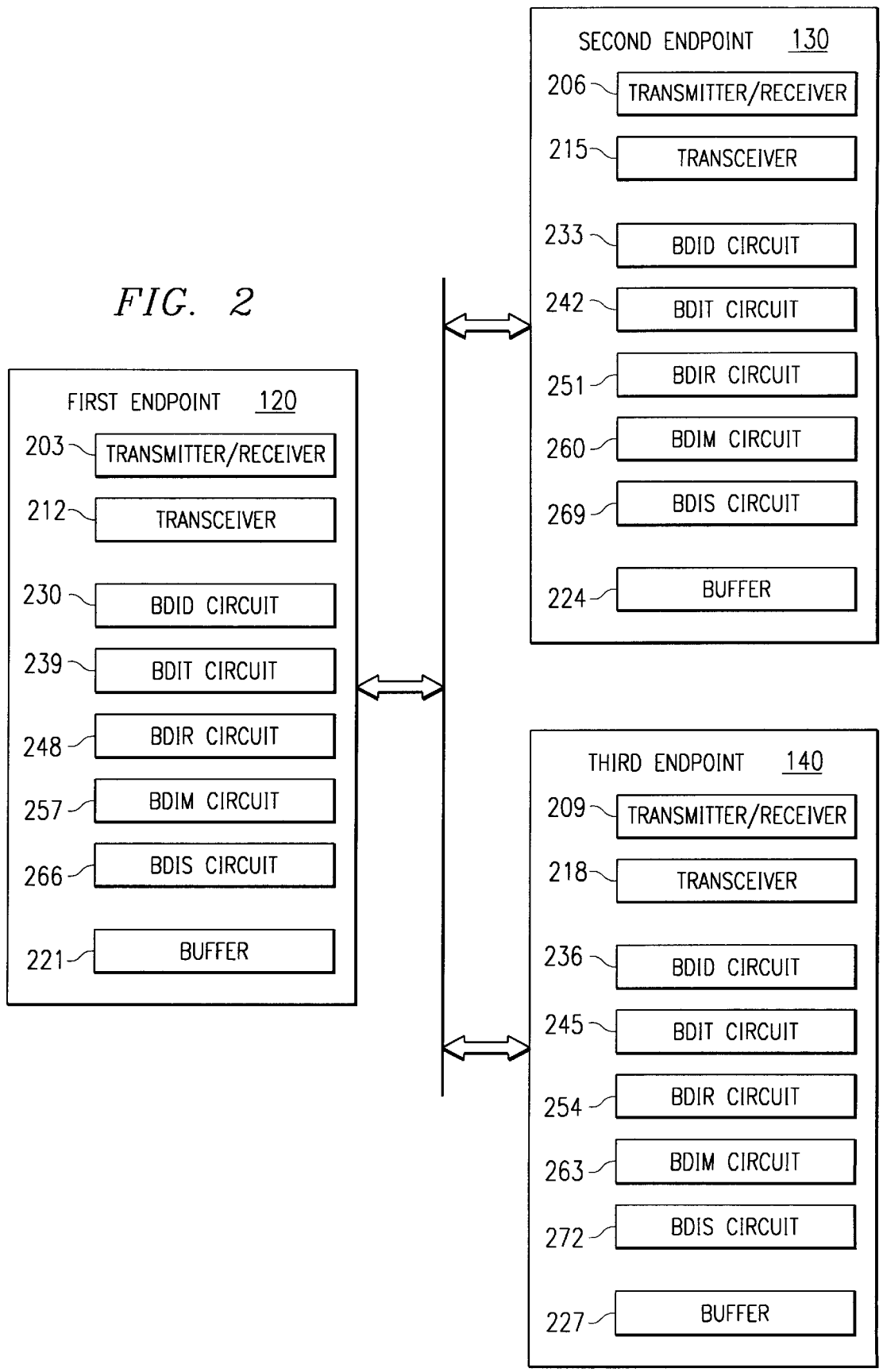
FIG. 2 illustrates a simplified block diagram of the communications network of FIG. 1 whereby each endpoint includes an embodiment of a subsystem constructed according to the principles of the present invention.

Turning now to FIG. 2, illustrates a simplified block diagram of the communications network 100 of FIG. 1 whereby each endpoint includes an embodiment of a subsystem constructed according to the principles of the present invention. The first, second and third endpoints 120, 130, 140 each include a communications channel transmitter/receiver ("transmitter/receiver") 203, 206, 209, respectively, that transmit and receive the bonded call from and at the respective endpoint. Of course, the communications channel transmitter/receivers 203, 206, 209 may equally be embodied as discrete components. The first, second and third endpoints 120, 130, 140 each also include a buffer depth index information transceiver ("transceiver") 212, 215, 218, respectively, that provides an interface for values of buffer depth indices associated with the bonded call transmitted from or received at the respective endpoint. The first, second and third endpoints 120, 130, 140 each also include a buffer 221, 224, 227, respectively, for storing, among other things, the information associated with the bonded call such as caller identification and the values of the buffer depth indices.

The first, second and third endpoints 120, 130, 140 each still further include a buffer depth index detection ("BDID") circuit 230, 233, 236, respectively, a buffer depth index transmission ("BDIT") circuit 239, 242, 245, respectively, a buffer depth index reception ("BDIR") circuit 248, 251, 254, respectively, a buffer depth index modification ("BDIM") circuit 257, 260, 263, respectively, and a buffer depth index storage ("BDIS") circuit 266, 269, 272, respectively. The aforementioned elements all make-up a representative subsystem constructed according to the principles of the present invention.

Figure 3:
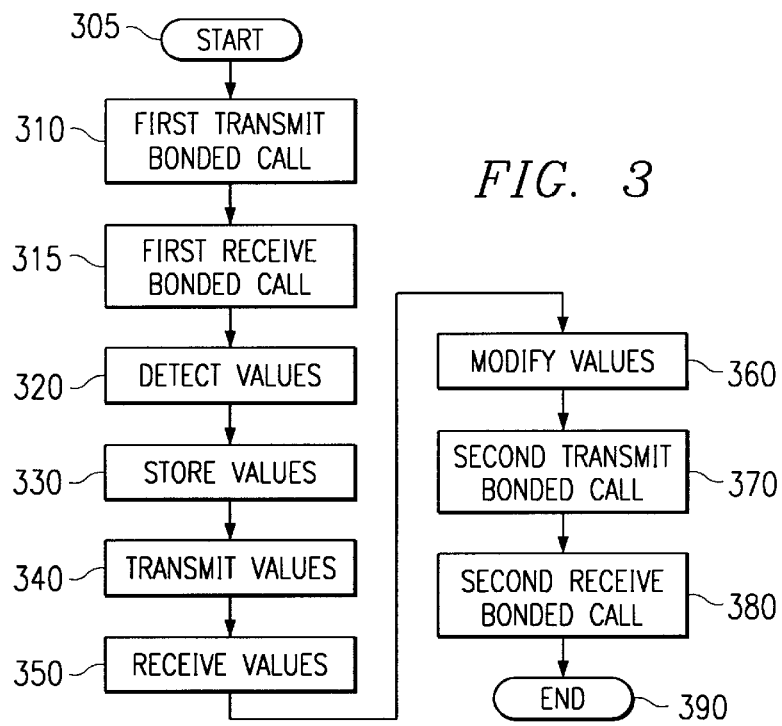
FIG. 3 illustrates a flow diagram of an embodiment of a method according to the principles of the present invention.

Turning now to FIG. 3, illustrated is a flow diagram of an embodiment of a method according to the principles of the present invention. The following method employs the communications network and subsystems as introduced with respect to FIGS. 1 and 2. The method of preserving a relative latency of the plurality of bonded communication channels commences at a start step 305. The bonded call is transmitted between the first and second endpoints using the plurality of bonded communication channels at a first transmit bonded call step 310. The bonded call is received at the second endpoint at a first receive bonded call step 315. The second endpoint detects the values of the buffer depth indices associated with the bonded call and stored at a first location during a detect values step 320.

The learned values are temporarily stored for subsequent restoration to the buffer depth indices to allow the bonded call to be placed on hold, if necessary, during a store values step 330.

The learned values are transmitted to a second location accessible by the third endpoint to allow the bonded call to be transferred to the third endpoint at a transmit values step 340. The third endpoint receives the learned values without requiring the third endpoint to relearn the values at a receive values step 350.

Assuming that the local area subnetwork is a nonmonochronomic subnetwork, the method further includes the step of modifying the learned values as a function of static transit time differences between the second and third endpoints to allow the bonded call to be transferred from the second endpoint to the third endpoint without substantially altering the relative latency at a modify values step 360. Of course, if the local area subnetwork is a monochronomic network, then the preceding step would not be necessary.

The bonded call is transmitted from the second endpoint at a second transmit bonded call step 370 and the bonded call is received at the third endpoint at a second receive bonded call step 380.

The method concludes at an end step 390. The method therefore preserves the relative latency of the bonded communication channels to allow the bonded call to be transferred to the third endpoint without requiring the third endpoint to relearn the values of the buffer depth indices. Of course, the endpoints may be reversed to allow the bonded call, for instance, to be transferred from the third endpoint to the second endpoint.

Again, the previously described method is one representative embodiment of transferring a bonded call and other embodiments capable of preserving the relative latency of the bonded communication channels are well within the broad scope of the present invention.

Figure 4:
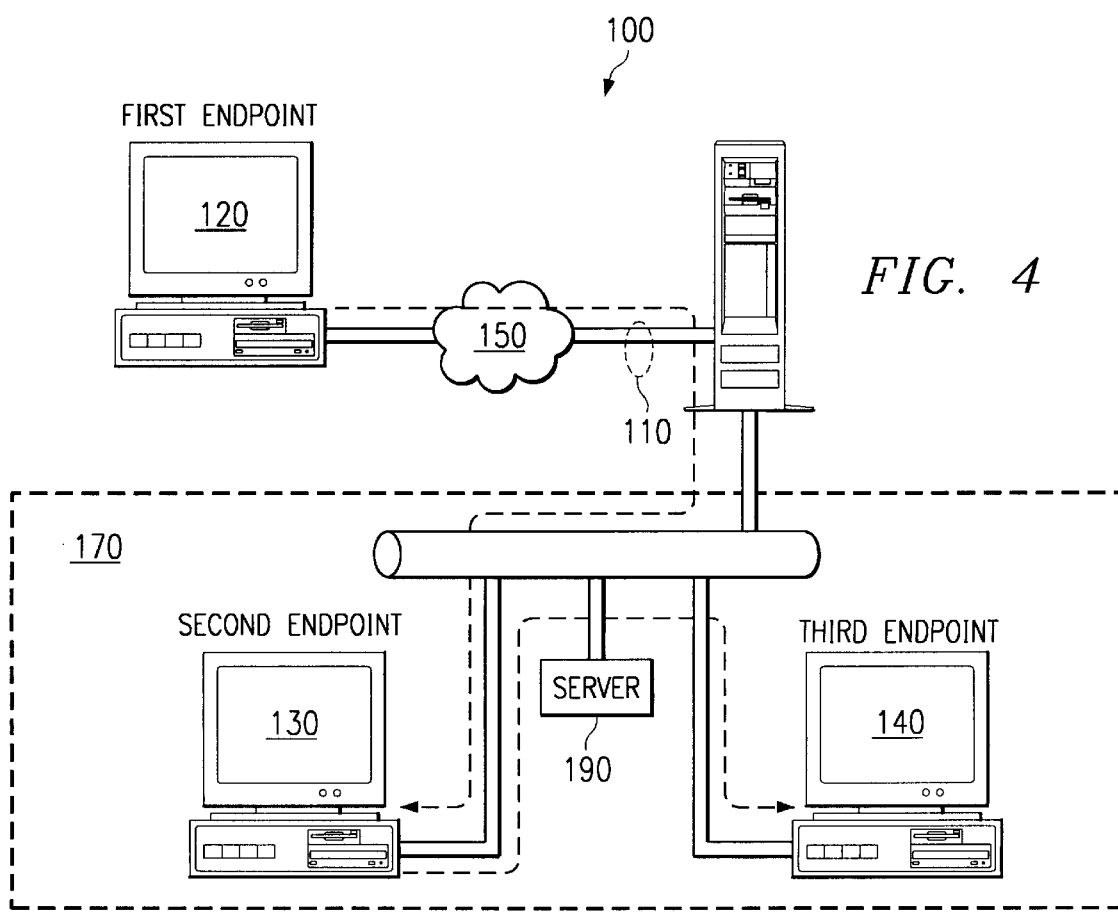
FIG. 4 illustrates a block diagram of the communications network of FIG. 1 employing the subsystems of FIG. 2 and the method of FIG. 3.

Turning now to FIG. 4, illustrated is a block diagram of the communications network 100 of FIG. 1 employing the subsystems of FIG. 2 and the method of FIG. 3. The transmitter/receiver 203 transmits the bonded call between the first and second endpoints 120, 130 using the plurality of bonded communication channels 110. The bonded call is received at the transmitter/receiver 206 of the second endpoint 130. The BDID circuit 233 detects (through the transceiver 215) the learned values of the buffer depth indices associated with the bonded call and stored at the server (the first location) 190. The initial values of the buffer depth indices are previously determined and stored at the server 190. While the first location is located within the server (a shared resource) 190 in the illustrated embodiment, it may be positioned at other locations such as, without limitation, at the second endpoint 130 within the communications network 100.

Since the local area subnetwork 170 is a nonmonochronomic subnetwork, the learned values are modified within the BDIM circuit 260 as a function of static transit time differences between the second and third endpoints 120, 130 to allow the bonded call to be transferred from the second endpoint 120 to the third endpoint 130 without substantially altering the relative latency. Additionally, the learned values are temporarily stored in the BDIS circuit 269 for subsequent restoration of the buffer depth indices to allow the bonded call to be placed on hold, if necessary.

The transmitter/receiver 206 transmits the bonded call from the second endpoint 130 to the third endpoint 140. The transmitter/receiver 209 receives the bonded call at the third endpoint 140. Simultaneously, the BDIT circuit 233 transmits the learned values to the server 190 (also the second location in the illustrated embodiment) accessible by the third endpoint 140 to allow the bonded call to be transferred to the third endpoint 140. While the second location is located at the server 190 in the illustrated embodiment, it may be positioned at other locations such as, without limitation, at the third endpoint 140 or another server within the communications network 100. The BDIR circuit 254 receives the learned values (through the transceiver 218) and initializes the buffer 227 in accordance with the learned values to allow the bonded call to be transferred to the third endpoint 140 without requiring the third endpoint 140 to relearn the values. Again, the endpoints may be reversed to allow the bonded call, for instance, to be transferred from the third endpoint 140 to the second endpoint 130.

Figure 5:
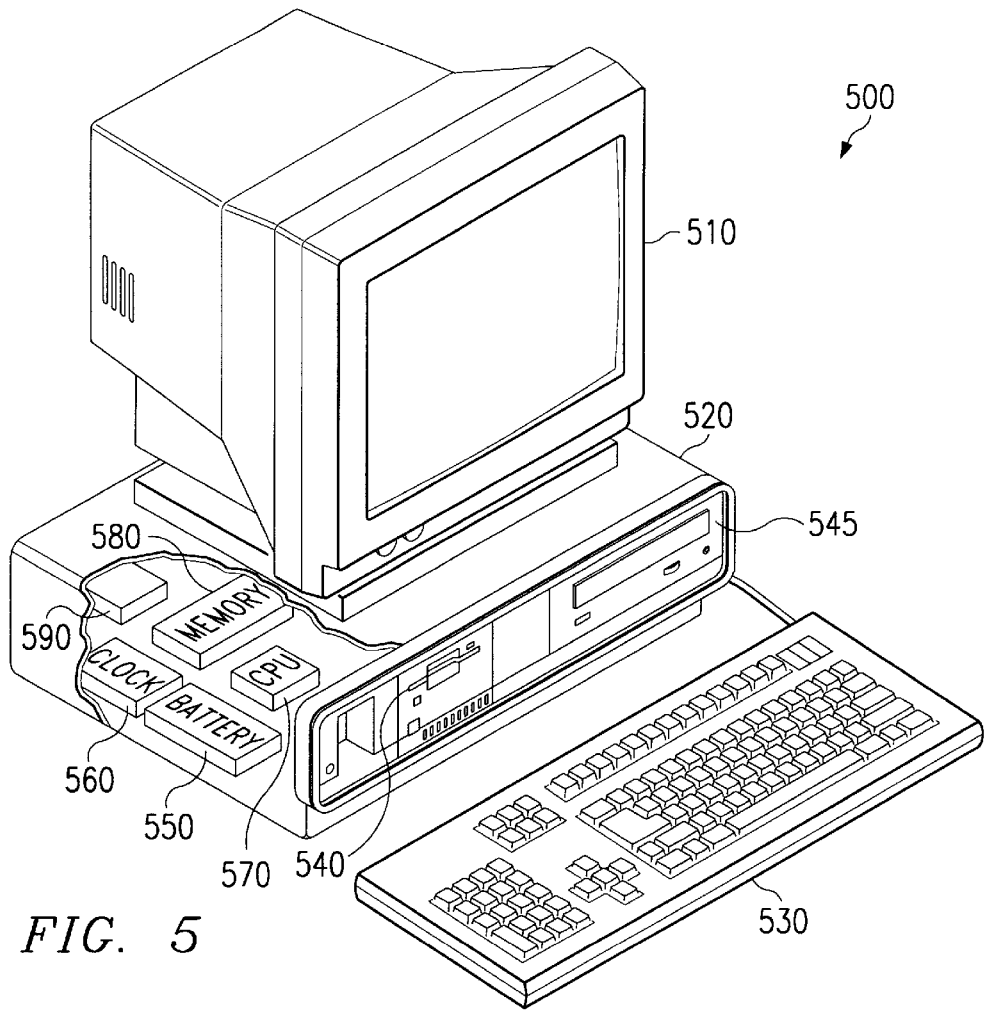
FIG. 5 illustrates an isometric view of an embodiment of a programmable general purpose computer constructed according to the principles of the present invention.

Turning now to FIG. 5, illustrated is an isometric view of an embodiment of a programmable general purpose computer 500 constructed according to the principles of the present invention. The computer 500 may serve, for instance, as an endpoint in the communications network 100 of FIG. 1. Again, since the present invention is not limited to application in a general purpose computer environment, however, FIG. 5 is presented only for illustrative purposes.

The computer 500 includes a monitor or display 510, a chassis 520 and a keyboard 530. The monitor 510 and the keyboard 530 cooperate to allow communication (e.g., via a graphical user interface, or "GUI") between the computer 500 and the user. Alternatively, the monitor 510 and keyboard 530 may be replaced by other conventional output input devices, respectively. The chassis 520 includes both a floppy disk drive 540 and hard disk drive 545. The floppy disk drive 540 is employed to receive, read and write to removable disks; the hard disk drive 545 is employed for fast access storage and retrieval, typically to a nonremovable disk. The floppy disk drive 540 may be replaced by or combined with other conventional structures to receive and transmit data and instructions, including without limitation, tape and compact disc drives, telephony systems and devices (including videophone, paging and facsimile technologies), and serial and parallel ports.

The chassis 520 is illustrated having a cut-away portion that includes a battery 550, clock 560, processor 570 (e.g., Intel® Pentium® Processor), memory 580 and a digital signal processor 590. Although the computer 500 is illustrated having a single processor 570, hard disk drive 545 and memory 580, the computer 500 may be equipped with a plurality of processors and peripheral devices.

It should be noted that any conventional computer system having at least one processor that is suitable to function as a general purpose computer may replace, or be used in conjunction with, the computer 500, including, without limitation: hand-held, laptop/notebook, mini, mainframe and supercomputers, including RISC and parallel processing architectures, as well as within computer system/network combinations. Alternative computer system embodiments may be firmware-or hardware-based.

Additionally, the meaning of the following terms and phrases should be understood: the term "or" is inclusive, meaning and/or; the terms "include," "includes" or "including" mean inclusion without limitation; the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like; and the phrase "memory map" and derivatives thereof may mean a method by which a computer translates between logical and physical address space, and vise versa.

Figure 6:
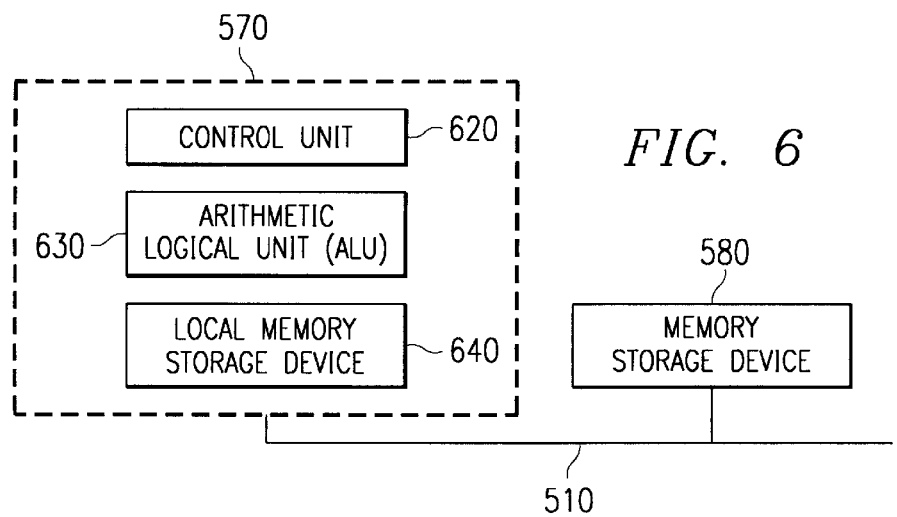
FIG. 6 illustrates a block diagram of an embodiment of the processor associated with the general purpose computer of FIG. 5.

Turning now to FIG. 6, illustrated is a block diagram of an embodiment of the processor 570 associated with the general purpose computer 500 of FIG. 5. The processor 570 is coupled to the memory 580 by a data bus 610. The memory 580 generally stores data and instructions that the processor 570 uses to execute the functions necessary to operate the computer 500. The memory 580 may be any conventional memory storage device. The processor 570 includes a control unit 620, arithmetic logic unit ("ALU") 630 and local memory 640 (e.g., stackable cache or a plurality of registers). The control unit 620 fetches the instructions from memory 580. The ALU 630, in turn, performs a plurality of operations, including addition and boolean AND, necessary to carry out the instructions fetched from the memory 580. The local memory 640 provides a local high speed storage location for storing temporary results and control information generated and employed by the ALU 630.

In alternate advantageous embodiments, the processor 570 may, in whole or in part, be replaced by or combined with any suitable processing configuration, including multi and parallel processing configurations, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted also that while the processor 570 includes the bus configuration as illustrated, alternate configurations are well within the broad scope of the present invention. Furthermore, conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993) and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Also, conventional electronic circuit design is more fully discussed in *The Art of Electronics*, by Paul Horowitz and Winfield Hill, Cambridge University Press, 2nd Ed. (1989).

Each of the foregoing publications is incorporated herein by reference for all purposes.

In one embodiment of the present invention, the system and method for preserving a relative latency of the bonded communication channels is embodied, at least in part, as executable (e.g., object) code, stored in the memory storage device 580, executed, at least in part, by the processor 570 and displayed on the monitor 510. In connection therewith, an operating system and associate driver circuitry that facilitates communication with the network capable of establishing a bonded call at the endpoints in accordance with the system of the present invention is embodied, at least in part, as executable code, stored in the memory storage device 580 and executed in the processor 570.

Those skilled in the art should understand, therefore, that the present invention may be embodied in hardware, software, firmware or combinations thereof.

Although the present invention and its advantages have been described in detail, those skilled in the art should understand that they can make various changes, substitutions and alterations herein without departing from the spirit and scope of the invention in its broadest form.

What is claimed is:

1. A system for transferring a bonded call established between a first endpoint and a second endpoint from the second endpoint to a third endpoint, the system comprising:

a buffer depth index detection circuit operable to detect values of buffer depth indices associated with the bonded call, the values related to relative latencies of a plurality of bonded communication channels and stored at a first location accessible to the second endpoint; and a buffer depth index transmission circuit coupled to the buffer depth index detection circuit and operable to transmit the values to a second location accessible to the third endpoint to allow the bonded call to be transferred to the third endpoint without requiring the third endpoint to independently determine the values.

2. The system of claim 1, further comprising a buffer depth index reception circuit associated with the second location and operable to receive the values from the buffer depth index transmission circuit.

3. The system of claim 1, further comprising a buffer depth index modifying circuit coupled to the buffer depth index transmission circuit and operable to modify the values as a function of static transit time differences between the second and third endpoints.

4. The system of claim 1, further comprising a buffer depth index storage circuit coupled to the buffer depth index transmission circuit and operable to temporarily store the values, for subsequent restoration to the buffer depth indices, in response to the bonded call being placed on hold.

5. The system of claim 1, further comprising a buffer depth index information transceiver coupled to the buffer depth index transmission circuit and operable to provide an interface for the values transmitted from or received at the second endpoint.

6. The system of claim 1, further comprising:

a communications channel transmitter operable to transmit the bonded call from the second endpoint; and a communications channel receiver operable to receive the bonded call at the second endpoint.

7. The system of claim 1, wherein the second location is the third endpoint.

8. The system of claim 1, wherein the plurality of communication channels communicate a multimedia data stream between the first endpoint and the second endpoint.

9. The system of claim 1, wherein the system may be used in a communications network selected from the group consisting of:
an Asynchronous Transfer Mode (ATM) network;
a Private Switched Network; and
a Public Switched Network.

10. The system of claim 1, wherein the buffer depth index detection circuit and the buffer depth index transmission circuit comprise a sequence of executable software instructions.

11. A method for transferring a bonded call established between a first endpoint and a second endpoint from the second endpoint to a third endpoint, the method comprising:
storing values of buffer depth indices associated with the bonded call at a first location accessible to the second endpoint, the values related to relative latencies of a plurality of bonded communication channels;
detecting the values of the stored buffer depth indices; and
transmitting the values to a second location accessible to the third endpoint to allow the bonded call to be transferred to the third endpoint without requiring the third endpoint to independently determine the values.

12. The method of claim 11, further comprising receiving the values at the second location.

13. The method of claim 11, further comprising the step of modifying the values as a function of static transmit time differences between the second and third endpoints.

14. The method of claim 11, further comprising temporarily storing the values, for subsequent restoration to the buffer depth indices, in response to the bonded call being placed on hold.

15. The method of claim 11, further comprising the step of using a buffer depth index information transceiver to provide an interface for the values transmitted from or received at the second endpoint.

16. The method of claim 11, further comprising the steps of:
transmitting the bonded call from the second endpoint; and
receiving the bonded call at the second endpoint.

17. The method of claim 11, wherein the second location is the third endpoint.

18. The method of claim 11, further comprising the step of communicating a multimedia data stream between the first endpoint and the second endpoint using the plurality of communication channels.

19. The method of claim 11, wherein the method may be used in a communications network selected from the group consisting of:
an Asynchronous Transfer Mode (ATM) network;
a Private Switched Network; and
a Public Switched Network.

20. The method of claim 11, wherein the method is performed by executing a sequence of executable software instructions.

21. A system for transferring a bonded call established between a first endpoint and a second endpoint from the second endpoint to a third endpoint, the system comprising:
a buffer depth index detection circuit associated with the second endpoint and operable to detect values of buffer depth indices associated with the bonded call, the values related to relative latencies of a plurality of bonded communication channels;
a buffer depth index transmission circuit coupled to the buffer depth index detection circuit and operable to transmit the values to the third endpoint; and
a buffer depth index reception circuit coupled to the buffer depth transmission circuit and operable to receive the values and to initialize a buffer according to the values to allow the bonded call to be transferred to the third endpoint without requiring the third endpoint to independently determine the values.

22. The system of claim 21, further comprising a buffer depth index modifying circuit coupled to the buffer depth index transmission circuit and operable to modify the values as a function of static transit time differences between the second and third endpoints.

23. The system of claim 21, further comprising a buffer depth index storage circuit coupled to the buffer depth index transmission circuit and operable to temporarily store the values, for subsequent restoration to the buffer depth indices, in response to the bonded call being placed on hold.

24. The system of claim 21, further comprising a buffer depth index information transceiver coupled to the buffer depth index transmission circuit and operable to provide an interface for the values transmitted from or received at the second endpoint.

25. The system of claim 21, further comprising:
a communications channel transmitter operable to transmit the bonded call from the second endpoint; and
a communications channel receiver operable to receive the bonded call at the second endpoint.

26. The system of claim 21, wherein the plurality of communication channels communicate a multimedia data stream between the first endpoint and the second endpoint.

27. The system of claim 21, wherein the system may be used in a communications network selected from the group consisting of:
an Asynchronous Transfer Mode (ATM) network;
a Private Switched Network; and
a Public Switched Network.

28. The system of claim 21, wherein the second and third endpoints are within a local area network.

29. The system of claim 21, wherein the second and third endpoints are multimedia personal computers.

30. The system of claim 21, wherein the buffer depth index detection circuit, buffer depth index transmission circuit, and buffer depth index reception circuit comprise sequences of executable software instructions.

31. A multimedia communications network, comprising:
a plurality of communications channels capable of being bonded together;
first, second, and third endpoints, each endpoint comprising an audio and video input port and an audio and video output port; and
a system for transferring a multimedia bonded call established between the first and second endpoints from the second endpoint to the third endpoint, the system comprising:
a buffer depth index detection circuit associated with the second endpoint and operable to detect values of buffer depth indices stored at a first location accessible to the second endpoint, the values related to relative latencies of the plurality of communication channels; and
a buffer depth index transmission circuit coupled to the buffer depth index detection circuit and operable to transmit the values to a second location accessible to the third endpoint to allow the multimedia bonded call to be transferred to the third endpoint without requiring the third endpoint to independently determine the values.

32. The network of claim 31, wherein the system further comprises a buffer depth index reception circuit associated with the second location and operable to receive the values from the buffer depth index transmission circuit.

33. The network of claim 31, wherein the system further comprises a buffer depth index modifying circuit coupled to the buffer depth index transmission circuit and operable to modify the values as a function of static transit time differences between the second and third endpoints.

34. The network of claim 31, wherein the system further comprises a buffer depth index storage circuit coupled to the buffer depth index transmission circuit and operable to temporarily store the values, for subsequent restoration to the buffer depth indices, in response to the bonded call being placed on hold.

35. The network of claim 31, wherein the system further comprises a buffer depth index information transceiver coupled to the buffer depth index transmission circuit and operable to provide an interface for the values transmitted from or received at the second endpoint.

36. The network of claim 31, wherein the system further comprises:

a communications channel transmitter operable to transmit the bonded call from the second endpoint; and a communications channel receiver operable to receive the bonded call at the second endpoint.

37. The network of claim 31, wherein the second location is the third endpoint.

38. The network of claim 31, wherein the second and third endpoints are within a local area subnetwork.

39. The network of claim 31, wherein the first, seconds and third endpoints comprise multimedia personal computers.

40. The network of claim 31, wherein the buffer depth index detection circuit and the buffer depth index transmission circuit comprise a sequence of executable software instructions.

* * * * *